Sept. 21, 1937.  P. M. CONRAD  2,093,881
WELDING
Filed Nov. 22, 1935
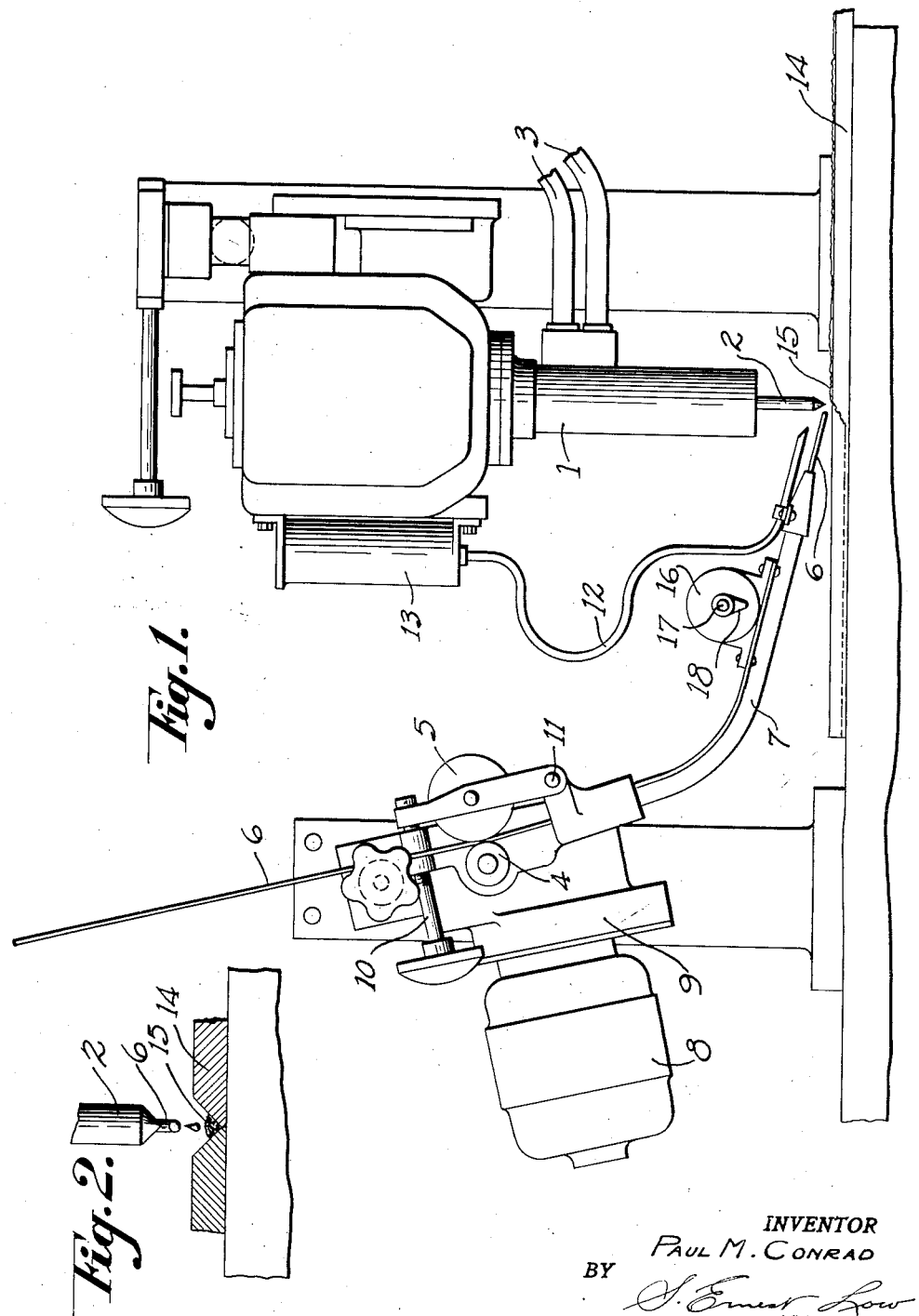
INVENTOR
PAUL M. CONRAD
BY
his ATTORNEY Patented Sept. 21, 1937

2,093,881

UNITED STATES PATENT OFFICE 2,093,881

WELDING

Paul M. Conrad, New Kensington, Pa., assignor to Aluminum Company of America, Pittsburgh, Pa., a corporation of Pennsylvania Application November 22, 1935, Serial No. 51,032

2 Claims. (Cl. 219—8)

This invention relates to welding apparatus, and particularly to welding apparatus wherein a filler wire or rod is fed into the fusion zone, where it is melted and deposited on the edges of the metal parts being welded together in any kind of continuous weld.

In the use of welding apparatus wherein a filler wire or rod is fed continuously to the fusion zone, and particularly in the welding of aluminum with such apparatus, a problem arises in the formation of globules of molten metal and adherence of these globules to the end of the filler rod. This adherence, with the continuous nature of the operation, results in gaps in the weld.

An object of this invention is to provide means for avoiding this difficulty. Another object of the invention is to provide means for forming a gapless continuous weld. Another object is to provide apparatus for welding aluminum with a gapless continuous weld.

In the drawing, for the purpose of illustration, is shown one method in carrying out my invention in connection with a continuous arc welding machine of the usual type, in which the work is in circuit with a carbon electrode.

Fig. 1 shows the arc welding machine with the invention embodied therein;

Fig. 2 shows a section through the work during the welding operation.

Referring now to the drawing, 1 is the welding head in which is mounted the welding electrode 2 energized through suitable conductors 3 from the source of welding current.

The coaction of a driven feed roller 4 and an idle feed roller 5 delivers the filler rod 6 to the arc through a suitable guide 7. The feed roller 4 is driven by the motor 8 through suitable gearing in the housing 9. The filler rod is held tightly between the feed rollers 4 and 5 by adjustment of the screw 10, which is adapted to move the roller 5 and its mounting about the pivot pin 11.

During operation, the relative positions of the filler rod feeding mechanism and the welding head remain fixed, and the filler rod 6 is fed into the fusion zone created by the welding arc, as needed. A liquid flux may be fed through the weld through the tube 12 from the container 13 mounted on the welding head. The work 14 in circuit with the electrode 2 is progressively moved with respect to the fusion zone as the weld 15 is formed.

A small motor 16 having a shaft 17 is mounted on the guide 7. Fixed to the motor shaft and adapted to be rotated thereby is a weight 18, the center of gravity of which lies outside the motor shaft 17, providing an eccentric loading condition for the motor. Due to this eccentric loading when the shaft is rotated, a definite vibratory impulse is created which, by reason of the mounting of the motor on the guide 7, is communicated to the filler rod 6.

In the welding of some materials, and particularly aluminum and aluminum alloys, where, of course, filler rod of a similar material is used, the metal melted from the filler rod forms enlarged drops or globules upon melting in the fusion zone. The deposit of the metal in these large globules results in an extremely uneven weld structure, and often causes the entrapment of air or gases, giving a porous and relatively weak weld. By vibrating the filler rod, as described, the molten metal is shaken from the rod before large globules can form, and the molten metal is deposited in the weld in extremely small globules. The weld formed in this manner is characterized by lack of porosity and by evenness.

The vibration of the filler rod should have a frequency in excess of 300 per minute in order to secure a sufficiently fine dispersion of the fused metal. The maximum amplitude of the vibration should not exceed $\frac{1}{8}$ of an inch. Vibrations within the limits of amplitude and frequency given will positively remove the molten metal from the end of the filler rod before globules of molten metal of a size which would deleteriously affect the weld can be formed.

Any suitable means for vibrating the filler rod may be used instead of the eccentrically loaded motor, and this means may be provided at any suitable point with relation to the end of the filler rod.

It will be understood that, while I have described my invention as applied to an electric arc welding apparatus, it may be applied to any welding apparatus wherein a filler wire or rod is fed into the fusion zone, as, for instance, in continuous torch welding. It will be understood also that other variations in the particular embodiment shown and described may be made without departing from my invention except as it is defined in the claims.

I claim:

1. A welding mechanism comprising an electrode for creating a fusion zone with a material to be welded, means for supporting a filler rod, means for advancing said filler rod into said fusion zone, and means associated with said filler rod-supporting means for vibrating the same.

2. A welding mechanism comprising an electrode for creating a fusion zone with a material to be welded, a guide for supporting a filler rod adjacent the electrode, feed rolls associated with said guide, means for driving said feed rolls whereby a filler rod clamped therebetween is advanced into said fusion zone, an electric motor mounted on said guide, said motor having its shaft eccentrically loaded whereby the guide is vibrated, and a container for flux having an outlet adjacent the fusion zone.

PAUL M. CONRAD.